S. E. SIEURIN.
REDUCING ORE BY MEANS OF SOLID, CARBONACEOUS MATERIAL.
APPLICATION FILED APR. 1, 1911.

1,054,873.

Patented Mar. 4, 1913.

WITNESSES:
John C. Sanders
Albert F. Heuman

INVENTOR
Sven Emil Sieurin
BY Wallace White
ATTORNEY

UNITED STATES PATENT OFFICE.

SVEN EMIL SIEURIN, OF HÖGANÄS, SWEDEN.

REDUCING ORE BY MEANS OF SOLID, CARBONACEOUS MATERIAL.

1,054,873. Specification of Letters Patent. Patented Mar. 4, 1913.

Application filed April 1, 1911. Serial No. 618,474.

*To all whom it may concern:*

Be it known that I, SVEN EMIL SIEURIN, a subject of the King of Sweden, residing at Höganäs, Sweden, have invented new and useful Improvements in Reducing Ore by Means of Solid, Carbonaceous Material, of which the following is a specification.

The reduction of ores into metals can be effected by placing the ore, in a more or less finely disintegrated state, mixed with a carbonaceous material or in alternate layers with such material in closed receptacles, which are heated to a temperature below the fusion point of the metal to be extracted. It has however proved to be difficult, after the completion of such a reducing process, to remove the metal from the receptacles, said metal forming hard, agglomerated porous pieces or cakes, which generally adhere so strongly to the walls of the receptacle that the latter is destroyed when the metal is to be taken out.

The present invention has for its object to overcome the said very serious inconvenience and consists therein, that the side walls and, if desired, also the bottom of the receptacle are lined, before, during, or after the introduction of the reducing agent and ore, with a material in the shape of powder or small pieces, which will not be subjected to any alteration during the heating of the receptacle and thus will not adhere to the walls nor to the metal. Such materials are for instance certain kinds of carbon and ashes, refractory sand and refractory clay. The lining can be effected in such way, that before the charging of the receptacle plates are inserted in the latter at some distance from its sides, the spaces between the said plates and the sides being filled with the lining material. Then the ore and the reducing material are introduced either in alternate layers or mixed together, and the plates are taken out, the receptacle is covered and is heated in order to perform the reduction. When the heating is completed, the spongy metal is found to be very easy to remove, because it does not adhere to the walls of the receptacle nor to the lining which consists of powder or small pieces.

Figure 1:
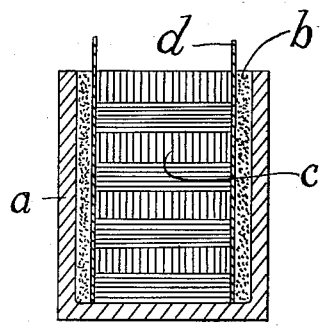
Figure 2:
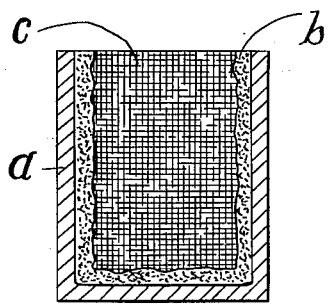

In the accompanying drawing, Figures 1 and 2 show vertical sections of two receptacles arranged according to the present invention, one of which is charged with ore and reducing material in alternate layers and the other with a mixture of both.

$a$ is the receptacle, $b$ the lining of the same, consisting of a material which will not adhere to the receptacle nor to the ore, $c$ the charge of ore and reducing material (either in alternate layers, as in Fig. 1, or mixed, as in Fig. 2), and $d$ the above-mentioned plates, which serve to facilitate the introduction of the lining $b$ and are afterward removed.

Having now particularly described the nature of my invention and the manner of its operation, what I claim is:

The process of reducing ore in a receptacle consisting in introducing within the receptacle an inner charge consisting of ore and solid carbonaceous material, and an outer layer consisting of comminuted material which will not bind with the reduced metal or with the walls of the receptacle, closing the receptacle and then heating it to a temperature necessary for the reduction without melting.

In testimony whereof I have signed my name to this specification in the presence of two subscribing witnesses.

SVEN EMIL SIEURIN.

Witnesses:
FREDE CARLSSON,
W. ORTENHOLM.